Patented June 2, 1936

2,042,938

UNITED STATES PATENT OFFICE 2,042,938

REFINING VEGETABLE MATERIAL

Winfrid Hentrich, Dusseldorf-Reisholz, and Friedrich Hoermann von und zu Guttenberg, Dusseldorf, Germany, assignors to firm Henkel & Cie., G. m. b. H., Dusseldorf, Germany No Drawing. Application July 16, 1934, Serial No. 735,446. In Germany July 26, 1933

8 Claims. (Cl. 99—103)

Many vegetable or plant materials such as fruits, leaves, rinds, and the like, and products obtainable from these, are rendered unfit for certain classes of use for which they are in themselves particularly suitable, by the presence of certain substances therein which on account of their physiological action, their poisoning property, smell, taste and the like, are detrimental to or prevent the application of the material to the special use. Numerous processes for improving such substances and making them useful are known, in which it has been attempted to remove the injurious substances from the material, usually by extraction.

The object of the present invention is a process for improving such material by a method which is different in principle from the known processes. This consists in that the undesirable constituents in the vegetable material are brought into a state in which they are harmless for the special purposes of use. Numerous tests have shown that the injurious constituents in the vegetable material can be made harmless by a treatment with substances containing an alkylene oxide group.

The action of the alkylene oxide can be explained in that the alkylene oxides, which have a remarkable reactive capacity, act in some manner on the bodies, which are the carriers of the injurious properties, reacting with the said bodies with the formation of new harmless bodies. An advantage of the improved process consists inter alia, in that the alkylene oxide compounds exert their action at comparatively low temperatures. In this way, a great disadvantage of many other improving processes is avoided in which it is necessary to use temperatures at which the valuable constituents such as carbohydrates and albumen are damaged.

The method of carrying the improved process into effect is very simple. The vegetable material is brought for a sufficient period of time into intimate contact with gaseous or liquid alkylene oxide compounds, the operation being carried out continuously or intermittently in direct or counter current and with normal or elevated pressure. The material can, if necessary, for example for facilitating the action, be subjected to preliminary treatments such as reduction, drying and defatting. After sufficient reaction has taken place, the alkylene oxide is removed. The process is particularly simple in the use of gaseous ethylene oxide.

A known important improving problem of the kind mentioned in the foregoing is the disembittering of, for example, lupines, which in spite of their high content of albumen and carbohydrates cannot be used as feeding stuff in their primary form. With the process hitherto proposed for removing the bitterness from lupines, the bitter material is removed by extraction processes, usually by treatment with aqueous solutions, with which many disadvantages occur. For example, the losses in valuable substances amount to at least 15%. These lupines can now be disembittered according to the new process, that is by a treatment with, for example, ethylene oxide, in a simple and easy manner and thus be converted into a valuable feeding stuff.

Ground lupine seeds are brought into intimate contact with ethylene oxide. Preferably, an increased pressure is employed in this reaction, the ethylene oxide being placed while in the liquid state in the reaction chamber. After slightly raising the temperature an increase in the pressure occurs due to increase in evaporation. When the reaction is completed, the disembittered material is freed from residues of ethylene oxide by treatment under vacuo and, if necessary, at raised temperature.

The treatment with alkylene oxides may be followed by a subsequent treatment for the further improvement of the product, for example should residues of the alkylene oxides remain in the material, additional treatments may be necessary for their removal, in which the known processes such as subjection to low pressures, the passing through of vapours or gases, treatment with solvents may be employed. An after treatment of special value consists, if the initial material contains fat or oil, in the material being subjected to the known processes of extraction. The particular value of this after treatment consists only partly, if at all, in the removal of the fat or oils. It has been found that the injurious substances converted by the alkylene oxide are removed, together with the fat or oil, while it is not, or not always possible, to also extract with the fat or oil, the injurious substance in its original form. By such a combined process, a particularly effective improvement can be attained, but the extraction is not in all cases necessary. A further advantage of the extraction consists in that any possible residues of the alkylene oxides are thereby also removed.

When, for example, the lupines treated with ethylene oxide according to the above example were subsequently de-fatted with benzene, the last trace of bitter taste disappeared. Analysis of the final products also showed a complete freedom from alkaloids. The injurious substance could not be detected in the final product either as originally present or as converted by the ethylene oxide.

As alkylene oxides in the sense of the new process may be used bodies which contain at least one alkylene oxide group, thus, for example, ethylene oxide, its cyclic homologues and cyclic oxides, such as tetrahydro-benzol oxide, and the derivatives of such bodies, as for example those which contain also one or more halogen atoms, or other substituents, such as epichlorohydrin and glycide. These bodies can be used alone or in admixture, or with the addition of other inert bodies or such as also have an action on the injurious constituents. Catalytically acting substances may also be added unless they injure the valuable constituents of the plant material or prejudice the purpose for which the material is to be employed. As suitable for the improvement according to the process described, the vegetable materials of the class indicated in the foregoing come into consideration, in so far as the carriers of the injurious properties are bodies which are capable of acting on the alkylene oxides. To these bodies belong, inter alia, the alkaloids and particularly substances which contain reactive groups such as the OH, SH and NH groups.

It is clear that the new process is of great technical and economical importance. It is, for example, of great importance that there is now the possibility of removing the bitterness from lupines with a simple process and without loss in valuable constituents.

EXAMPLES

Disembittering of lupines

1. The lupines, preferably coarsely ground, are introduced into a closed vessel with is evacuated. While well stirring, ethylene oxide, preferably in liquid form, is added. The ethylene oxide is allowed to act for some considerable time without external heating. The resumption of the ethylene oxide takes place very ambitious and with evolution of heat. At the commencement, a partial volatilization of the ethylene oxide occurs. During combination, however, there is again a lowering of pressure. The uncombined ethylene oxide can be very readily recovered and liquefied again. The material may be treated further with fat extracting agents.

In the case of lupines not treated with ethylene oxide, it is possible to dissolve out the fat completely with known good fat solvents, for example ether or benzine, but the alkaloids are only extracted at the same time to a very slight extent. In the case of material treated with ethylene oxide, however, an almost complete extraction of the bitter substances takes place at the same time as the extraction of the fat, the said bitter substances being easily separated from the fat.

1000 kilograms of coarsely ground lupines with a content of 5.09 per cent of fat and 0.886 per cent, of alkaloids (referred to the dry substance) and 11.5 per cent of water are treated with 50 kilograms of ethylene oxide. Extraction with ethyl alcohol (94 to 96 per cent) is thereupon effected. After drying, 921 kilograms of disembittered lupines of excellent taste and having a content of 10 per cent of water are obtained. The material still contains 0.50 per cent of fat and 0.012 per cent of alkaloids. No appreciable loss of protein and carbohydrate is observed.

2. 1000 kilograms of coarsely ground lupines of the same composition as in Example 1 are treated with 30 kilograms of ethylene oxide. After extraction with alcohol and drying, 933 kilograms of disembittered lupines with a content of 10 per cent of water are obtained. The material has a fat content of 1.55 per cent and an alkaloid content of 0.050 per cent referred to the dry substance.

We claim:

1. The process of improving lupines, which comprises the step of treating the lupines with at least one compound selected from the class consisting of compounds containing at least one alkylene oxide group.

2. The process as set forth in claim 1, wherein the treatment is carried out at elevated pressure.

3. The process of improving lupines which comprises subjecting the lupines to the action of of an alkylene oxide compound, and subsequently treating the resulting material for the removal of any residual alkylene oxide compound.

4. The process of improving lupines which comprises treating the lupines with an alkylene oxide compound, subjecting the treated material to the action of a solvent for fats, and separating the material from the solvent and its extract.

5. The process of improving lupines, which comprises treating coarsely ground lupines with an alkylene oxide compound.

6. The process of improving lupines, which comprises subjecting the lupines to the action of an alkylene oxide compound, and subsequently subjecting the resulting material to low pressures.

7. The process of improving lupines, which comprises subjecting the lupines to the action of an alkylene oxide compound, and subsequently treating the resulting material under a vacuum at raised temperature.

8. The process of improving lupines, which comprises subjecting the lupines to the action of an alkylene oxide compound, and subsequently passing vapors or gases through the resulting material.

WINFRID HENTRICH.
FRIEDRICH HOERMANN VON UND ZU GUTTENBERG.